(12) United States Patent
Mirell et al.

(10) Patent No.: US 11,681,084 B2
(45) Date of Patent: Jun. 20, 2023

(54) POLARIZATION-BASED METHOD AND APPARATUS FOR GENERATING DUALITY MODULATED ELECTROMAGNETIC RADIATION

(71) Applicants: Stuart Gary Mirell, Los Angeles, CA (US); Daniel Joseph Mirell, Irvine, CA (US)

(72) Inventors: Stuart Gary Mirell, Los Angeles, CA (US); Daniel Joseph Mirell, Irvine, CA (US)

( * ) Notice: Subject to any disclaimer, the term of this patent is extended or adjusted under 35 U.S.C. 154(b) by 1021 days.

(21) Appl. No.: 16/028,682

(22) Filed: Jul. 6, 2018

(65) Prior Publication Data

US 2019/0018175 A1 Jan. 17, 2019

Related U.S. Application Data

(60) Provisional application No. 62/530,939, filed on Jul. 11, 2017.

(51) Int. Cl.
| | |
|---|---|
| *G02B 5/30* | (2006.01) |
| *H01S 3/08031* | (2023.01) |
| *G02B 27/09* | (2006.01) |
| *G02B 27/28* | (2006.01) |

(52) U.S. Cl.
CPC ....... *G02B 5/3025* (2013.01); *G02B 27/0977* (2013.01); *G02B 27/283* (2013.01); *G02B 27/286* (2013.01); *H01S 3/08031* (2013.01)

(58) Field of Classification Search
CPC .. G02B 5/3025; G02B 27/283; G02B 27/286; G02B 30/25; G02B 27/0977; G02B 27/4261; H01S 3/08031; H04B 10/614; H04B 10/61; H04B 10/615; H04B 10/616; G02F 1/01; G02F 1/0136
USPC .......................... 359/485.01, 485.02, 485.03
See application file for complete search history.

(56) References Cited

U.S. PATENT DOCUMENTS

| | | | |
|---|---|---|---|
| 3,023,379 A | 2/1962 | Turner | |
| 4,730,170 A | 3/1988 | Kwan | |
| 6,028,686 A | 2/2000 | Mirell | |
| 6,674,579 B2 * | 1/2004 | Brennesholtz | G02B 27/1033 348/E9.027 |
| 6,804,470 B1 | 10/2004 | Mirell | |
| 7,262,914 B2 | 8/2007 | Mirell | |
| 8,081,383 B1 | 12/2011 | Mirell | |
| 8,670,181 B1 | 3/2014 | Mirell | |

(Continued)

OTHER PUBLICATIONS

Stuart Mirell, "Correlated photon asymmetry in local realism," Physical Review A, vol. 50, No. 1, pp. 839-842 (1994), scientific journal published by the American Physical Society.

(Continued)

*Primary Examiner* — Stephone B Allen
*Assistant Examiner* — Rahman Abdur
(74) *Attorney, Agent, or Firm* — Noel F. Heal (57) ABSTRACT

A polarization-based generator of duality modulated electromagnetic radiation, and a related method, by which the duality ratio of the energy-based irradiance and wave-based intensity may be selectively altered. A linearly polarized coherent radiation beam is incident on a polarizer configuration. Relative angular alignment of the beam's polarization and the polarizer configuration selectively provides output beams ranging from totally energy-depleted radiation to significantly energy-enriched radiation.

2 Claims, 1 Drawing Sheet

(56) References Cited

U.S. PATENT DOCUMENTS

| | | | | |
|---|---|---|---|---|
| 9,817,165 | B2* | 11/2017 | Mirell | G02B 5/1861 |
| 2003/0205681 | A1* | 11/2003 | Modlin | G01N 21/6452 |
| | | | | 250/458.1 |
| 2007/0116068 | A1* | 5/2007 | Mao | H01S 3/113 |
| | | | | 372/10 |
| 2009/0297155 | A1* | 12/2009 | Weiner | H04B 1/40 |
| | | | | 398/115 |
| 2013/0314784 | A1* | 11/2013 | Fattal | G02F 1/093 |
| | | | | 359/484.04 |
| 2016/0363446 | A1* | 12/2016 | Lefevre | G01C 19/722 |

OTHER PUBLICATIONS

Stuart Mirell and Daniel Mirell, "High Efficiency Interaction-free Measurement from Continuous Wave Multi-beam Interference," arXiv:quant-ph/9911076v2 Nov. 17, 1999, electronic archive of scientific papers.

Stuart Mirell, "Locally real states of photons and particles," Physical Review A, vol. 65 p. 032102/1-22, Jan. 30, 2002, scientific journal published by the American Physical Society.

Daniel Mirell and Stuart Mirell, "Experimental test for violation of duality on a photon beam," arXiv:quant-ph/0509028v4 Sep. 8, 2005, electronic archive of scientific papers.

Daniel Mirell and Stuart Mirell, "Duality violation from a grating," arXiv:1107.1306v1[quant-ph] Jul. 7, 2011, electronic archive of scientific papers.

Daniel Mirell and Stuart Mirell, "Macroscopic Violation of Duality Generated on a Laser Beam," Journal of Modern Physics, vol. 4 p. 911-922 July 2013, Online publication of Scientific Research Publishing Inc., www.SciRP.org.

Daniel Mirell and Stuart Mirell, "Macroscopic violation of duality generated on a laser beam," arXiv:1307.7193 [quant-ph] Jul. 26, 2013, electronic archive of scientific papers. (No copy attached. This reference is duplicative of Cite 6 above.).

De Broglie in 1927 reported in Rapport au V'ieme Congres de Physique Solvay, Gauthier-Villars, Paris 1930 and the Current Interpretation of Wave Mechanics: A Critical Study, Elsevier, Amsterdam (1969).

René Dandliker, "The concept of modes in optics and photonics," In Sixth International Conference on Education and Training in Optics and Photonics, J. Javier Sánchez-Mondragón, Editor, SPIE vol. 3831 (2000).

Bahaa E. A. Saleh and Malvin Carl Teich (first ed.) (1991) Fundamentals of Photonics. (Book.) New York: Wiley-Interscience Publications. ISBN 0-471-83965-5. pp. 700-709, 719-720, and 815-817.

C. Pellegrini, "The history of X-ray free electron lasers," The European Physical Journal H, Oct. 2012, vol. 37, Issue 5, pp. 659-708.

Robert G. Hunsperger (sixth ed.) (2009) Integrated Optics. (Book.) New York: Springer Sciences and Business Media. ISBN 978-0-387-89774-5. pp. 178-181.

Eugene Hecht and Alfred Zajac (1974). Optics. (Book.) Addison-Wesley Publishing Company, Inc. pp 225-226 and 263-266.

Emilio Segre (1965). Nuclei and Particles. (Book.) New York: W. A. Benjamin, Inc. p. 73.

* cited by examiner

POLARIZATION-BASED METHOD AND APPARATUS FOR GENERATING DUALITY MODULATED ELECTROMAGNETIC RADIATION

BACKGROUND OF THE INVENTION

The invention relates generally to techniques for generating electromagnetic (photon) beams of radiation that are modulated in irradiance relative to intensity of a real physical wave where irradiance is an energy flux density, quantifiable by conventional energy-sensitive detectors. Intensity is mathematically equivalent to a quantum mechanical probability flux density, quantifiable by interference phenomena with suitable reference beams. The term duality modulation is applied here to specify this form of modulation.

The invention meets a critical need in various applications of such duality modulated electromagnetic radiation. If the imposed duality modulation could provide negligible or inconsequential residual irradiance relative to a still substantial intensity, the resultant radiation may then effectively be identified as "totally depleted." Thus one important object of the present invention is to generate electromagnetic radiation that is totally depleted. A related object of the invention is to generate an energy-enriched duality modulated beam.

The theoretical principles that provide the basis for duality modulation have been reported earlier by the inventors and others. Some of the basic methods for producing duality modulation have been previously described by the inventors. See, for example:

U.S. Pat. No. 6,028,686, Feb. 22, 2000, by Stuart Gary Mirell and Daniel Joseph Mirell, "Energy-Depleted Radiation Apparatus and Method," and references cited therein.

U.S. Pat. No. 6,804,470, Oct. 12, 2004, by Stuart Gary Mirell and Daniel Joseph Mirell, "Energy-Depleted Radiation Apparatus and Method," and references cited therein.

U.S. Pat. No. 7,262,914 by Stuart Gary Mirell and Daniel Joseph Mirell, Aug. 28, 2007, "Method and apparatus for generating and detecting duality modulated electromagnetic radiation."

U.S. Pat. No. 8,081,383, Dec. 20, 2011, by Stuart G. Mirell and Daniel J. Mirell, "Coupler and related method for equilibrating a duality modulated beam with another beam using one or more Mach-Zehnder stages."

U.S. Pat. No. 8,670,181, Mar. 11, 2014, by Stuart G. Mirell and Daniel J. Mirell, "Method and apparatus for generating duality modulated electromagnetic radiation."

U.S. Patent Publication No. U.S. 2014/0300968, Pub. Date Oct. 9, 2014, entitled "Cascade Method and Apparatus for Generating Increased Duality Modulation of Electromagnetic Radiation, by Stuart Gary Mirell and Daniel Joseph Mirell."

Stuart Mirell, "Correlated photon asymmetry in local realism," Physical Review A, Volume 50, No. 1, pp. 839-842 (1994).

Stuart Mirell and Daniel Mirell, "High Efficiency Interaction-free Measurement from Continuous Wave Multi-beam Interference," arXiv:quant-ph/9911076v2 17 Nov. 1999.

Stuart Mirell, "Locally real states of photons and particles," Physical Review A, Volume 65 p. 032102/1-22 Mar. (2002).

Daniel Mirell and Stuart Mirell, "Experimental test for violation of duality on a photon beam," arXiv:quant-ph/0509028v4 8 Sep. 2005.

Daniel Mirell and Stuart Mirell, "Duality violation from a grating," arXiv:1107.1306v1 [quant-ph] 7 Jul. 2011.

Daniel Mirell and Stuart Mirell, "Macroscopic Violation of Duality Generated on a Laser Beam," Journal of Modern Physics, Volume 4 p. 911-922 July (2013).

Daniel Mirell and Stuart Mirell, "Macroscopic violation of duality generated on a laser beam," arXiv:1307.7193 [quant-ph] 26 Jul. 2013.

U.S. Pat. No. 4,730,170, Mar. 8, 1988, by Thomas J. T. Kwan and Charles M. Snell, "Virtual cathode microwave generator having annular anode slit."

U.S. Pat. No. 3,023,379, Feb. 27, 1962, by E. H. Turner, "Transversely magnetized non-reciprocal microwave device."

De Broglie in 1927 reported in Rapport au V'ieme Congres de Physique Solvay, Gauthier-Villars, Paris 1930 and The Current Interpretation of Wave Mechanics: A Critical Study, Elsevier, Amsterdam (1969).

René Dändliker, "The concept of modes in optics and photonics," In *Sixth International Conference on Education and Training in Optics and Photonics*, J. Javier Sánchez-Mondragón, Editor, SPIE Vol. 3831 (2000).

Bahaa E. A. Saleh and Malvin Carl Teich (first ed.) (1991) *Fundamentals of Photonics*. New York: Wiley-Interscience Publications. ISBN 0-471-83965-5. pp. 700-709, 719-720, and 815-817.

C. Pellegrini, "The history of X-ray free electron lasers," The European Physical Journal H, October 2012, Volume 37, Issue 5, pp 659-708.

Robert G. Hunsperger (sixth ed.) (2009) *Integrated Optics*. New York: Springer Sciences and Business Media. ISBN 978-0-387-89774-5. pp. 178-181.

Eugene Hecht and Alfred Zajac (1974). *Optics*. Addison-Wesley Publishing Company, Inc. pp 225-226 and 263-266.

Emilio Segre (1965). *Nuclei and Particles*. New York: W. A. Benjamin, Inc. p 73.

Although these prior patents and publications explain the fundamental theory and early experimental verification of the principles of duality modulated radiation, they fall short of teaching practical applications of these principles. The present invention is directed to a number of significant improvements for generating electromagnetic (photon) radiation modulated in energy relative to wave intensity and for demodulating that radiation.

In their U.S. Pat. No. 8,670,181 entitled "Method and Apparatus for Generating Duality Modulated Electromagnetic Radiation," the present inventors disclosed and claimed various embodiments of an invention relating to the goals outlined above. The disclosure of U.S. Pat. No. 8,670,181 is hereby incorporated by reference into this specification. Three of the inventors' earlier patents are also hereby incorporated by reference into this specification. These are U.S. Pat. Nos. 6,028,686 and 6,804,470, both entitled "Energy-Depleted Radiation Apparatus and Method" and U.S. Pat. No. 7,262,914 entitled "Method and Apparatus for Generating Duality Modulated Electromagnetic Radiation." Methods and apparatus disclosed in these three patents were subsequently disclosed in publications of the inventors, in "High Efficiency Interaction-free Measurement from Continuous Wave Multi-beam Interference," arXiv:quant-ph/9911076v2 17 Nov. 1999 and "Experimental test for violation of duality on a photon beam," arXiv:quant-ph/0509028v4 8 Sep. 2005.

In brief, all of the various forms of apparatus and corresponding methods that were claimed in U.S. Pat. No. 8,670,181 involved the use of a single coherent beam incident on a diffraction grating that generated a plurality of duality modulated output beams. This method was subsequently disclosed by the inventors in "Duality violation from a grating," arXiv:1107.1306v1 [quant-ph] 7 Jul. 2011, "Macroscopic Violation of Duality Generated on a Laser Beam," Journal of Modern Physics, Volume 4 pp 911-922 July (2013) and "Macroscopic violation of duality generated on a laser beam," arXiv:1307.7193 [quant-ph] 26 Jul. 2013.

Although this arrangement with a single coherent beam incident on a grating operates satisfactorily in a manner described in the inventors' U.S. Pat. No. 8,670,181, the total duality modulated output wave intensity is diluted among the plurality of output beams. Moreover, a single grating stage of such an arrangement provides only a very modest duality modulation on those output beams and inefficiently produces a significant loss of wave intensity in the process. Higher levels of duality modulation, for both energy depletion and energy enrichment, were subsequently achieved by cascading a multiplicity of such arrangements, each successive arrangement intercepting one of the plurality of duality modulated beams from the preceding stage. This technique is described in another application by the present inventors, published as U.S. Patent Publication No. 2014/0300968 and entitled "Cascade Method and Apparatus for Generating Increased Duality Modulation of Electromagnetic Radiation," which publication is also hereby incorporated by reference into the present application, and has issued on Nov. 14, 2017, as U.S. Pat. No. 9,817,165. However, with this cascading, the higher levels of duality modulation are achieved at the expense of the final output beam having an extremely lower wave intensity than that of the initial input beam.

Ideally, what is needed is a generator of duality modulation that substantially circumvents these problems by achieving high levels of duality modulation for each duality modulation stage accompanied by high efficiency at each stage. As described in the summary below, the present invention meets this need.

SUMMARY OF THE INVENTION

The present invention resides in a generator of duality modulated electromagnetic radiation and a related method for its use. The apparatus of the present invention most fundamentally comprises a source that provides a linearly polarized coherent beam of radiation and a polarizer configuration comprised of one or more polarizer components where the polarizer components are suitable for the wavelength of the incident source beam of radiation. The term "polarizer" as used in the present disclosure refers to a linear polarizer unless otherwise identified. Eugene Hecht and Alfred Zajac in their *Optics* (1974) Addison-Wesley Publishing Company, Inc. pp 225-226 define a linear polarizer as a device for receiving and outputting electromagnetic radiation that is consistent with Malus's Law.

Totally depleted radiation has utility in the conventional use of photon beams of radiation to scan and characterize a target object such as a biological specimen that would be potentially damaged in the process by excessive absorption of energy from a photon beam that was not depleted of radiation. Alternatively, in other particular applications it may be desirable to minimize a target object's capability to detect an interrogating scan beam by using a totally depleted radiation beam. In various communications applications, the objective may be to securely transmit a signal beam without incurring interception and detection by conventional receivers. All of these applications would benefit from the use of duality modulated beams totally depleted in energy. Other applications make use of energy-enriched duality modulated beams. For example, a steady-state energy-enriched beam coupled with an ordinary (non-duality modulated) very weak signal beam may be used to directly amplify the conventional detectability of the signal beam.

For the various embodiments of the invention a single longitudinal mode (SLM) radiation source provides functionality while for particular embodiments, a multilongitudinal mode (MLM) radiation source alternatively provides comparable functionality.

The polarizer configuration may consist of a single polarizer component, a sequential assembly of functionally equivalent individual polarizer components, or an assembly in which a source beam of radiation is repeatedly redirected to a single polarizer component.

Either one- or two-channel individual polarizer components are suitable in various embodiments of the invention, where a one-channel polarizer component has a single polarization axis at its input and a corresponding single output providing an output source beam of radiation with that polarization axis while a two-channel polarizer component has two orthogonal polarization axes at its input and two physically separate, corresponding outputs providing two output source beams of radiation with those respective orthogonal polarization axes.

The invention in at least one of its embodiments includes "polarization rotation means" to selectively align the relative rotational angle of the source beam's polarization axis and the polarizer configuration. The polarizer rotation means provides the capability to select a particular duality modulation of output beam radiation over a range extending from total depletion to the maximally achievable enrichment associated with the polarizer configuration.

Another embodiment of the invention also includes "conventional modulation means," which imposes a temporal conventional modulation on the output duality modulated beams of radiation.

The terms "beam" and "beams" are used in this specification to refer concisely to the initial source beam of radiation, and to radiation in its modulated forms as it progresses through a polarizer configuration, dividing into two output beams at each interaction with a two-channel polarizer.

As embodied in a novel method, the present invention comprises, in general terms, the steps of providing a coherent linearly polarized electromagnetic radiation source beam having a selected polarization axis; receiving the source beam at an input to a polarizer configuration; and emitting from at least one output of the polarizer configuration an electromagnetic radiation beam. The selected polarization axis of the source beam, relative to the polarizer configuration, imposes a desired duality modulation on the beam emitted from the at least one output of the polarizer configuration.

It will be appreciated from the foregoing that the present invention may take various forms or embodiments, which will be better understood from the following brief description of the drawings and the more detailed description of the invention that follows.

DETAILED DESCRIPTION OF THE INVENTION

As depicted in the drawings for purposes of illustration, the present invention pertains to novel and effective techniques for generating high levels of duality modulated coherent beams of electromagnetic radiation.

However, the underlying basis of the invention originates with the wave structures of discrete photons that have no phase relation with each other rather than with coherent beams of photons. Those wave structures are given in two papers authored by one of the present inventors. Specifically, Stuart Mirell, "Correlated photon asymmetry in local realism," Physical Review A, Volume 50, No. 1, pp. 839-842 (1994), and Stuart Mirell, "Locally real states of photons and particles," Physical Review A, Volume 65 p. 032102/1-22 Mar. (2002). These reference papers are referred to herein for convenience as Ref. '94 and Ref. '02, respectively. In those references representative groups or "ensembles" of linearly polarized discrete photons are shown to have a definite wave structure distribution in the plane transverse to their propagation axis.

For convenience, the incident photons are defined as having dimensionless values of irradiance I=1 and wave intensity W=1. The unit value of the irradiance effectively states that the wave packet is occupied by a single energy quantum. The unit value of the packet's wave intensity, equal in magnitude to the irradiance, further identifies these photons as "ordinary" in that they are consistent with conventional quantum duality that requires a fixed ratio for a photon's particle-like (or energy-like) property and its wave-like property. The ratio $\Omega=I/W$ defines the "occupation value" which is itself unity, i.e. $\Omega=1$, for ordinary photons while $\Omega>1$ for "enriched" photons and $\Omega<1$ for "depleted" photons, effectively expressing the magnitude of energy quanta occupying a wave packet relative to the magnitude of that wave packet. For example, when $\Omega=1.2$ the photon is said to be 20% enriched which constitutes a duality modulation of +20% relative to unity for an ordinary photon. Conversely, if $\Omega=0$ the photon is 100% depleted which constitutes a -100% duality modulation and such a "photon" is more appropriately identified as an "empty" or totally depleted wave packet because of its lack of an energy quantum.

When an ensemble of these ordinary discrete photons is incident on a two-channel polarizer, the average irradiance and wave intensity of the photon wave packets emerging from the polarizer's two outputs can be calculated from the transverse wave structure distribution given in Refs. '94 and '02 as a function of the angular alignment of the ensemble polarization axis and the polarizer. The average wave intensities are calculated from the projections of the ensemble member orientations onto the V and H axes of the polarizer. The squares of the respective projections, averaged over the distribution of ensemble member transverse wave packet bisector orientations, provide the averaged vertical axis output intensity $W_v$ and horizontal axis output intensity $W_h$.

The special case of the ensemble polarization axis in alignment with one of the polarization axes of the polarizer is counterintuitively of particular interest and its interpretation significantly contributes to the non-obviousness and novelty of the invention. For example, if that alignment is identified as the polarizer's "vertical" axis, the average irradiance of photons emerging from the polarizer's vertical output is $I_v=1$ and the corresponding average wave intensity is $W_v=0.89$. From the polarizer's horizontal output $I_h=0$ and $W_h=0.11$.

These results show that 100% of the vertical output wave packets are still identifiable as "photons" since they all possess an energy quantum and, from the standard interpretation in the art, are unremarkably totally undiminished relative to the incident photons. However, calculation shows that these output photons are enriched on average by 12% with a duality modulation of +12% because their average wave intensity of $W_v=0.89$ gives an average occupation value $\Omega_v=1/0.89=1.12$. Conversely, the horizontal output yields only "photons" depleted by 100% with a duality modulation of −100% that are more appropriately identified as empty wave packets rather than photons because they lack an energy quantum but still possess an average wave intensity of $W_h=0.11$ resulting in an occupation value of $\Omega_h=0/0.11=0$.

These results show that a wave packet incident on a polarizer sustains an average reduction of intensity when it emerges from a polarizer output. This reduction occurs whether that output is associated with a transmission or a reflection from with the polarizer and the reduction occurs even if the polarizer is ideal. In contrast, components such as an ideal transparent glass plate and an ideal mirror can respectively transmit and reflect wave packets without reduction of intensity. Consequently, transmissions and reflections of a wave packet from a polarizer are both classified here jointly as "interactions" in emphasis of the consequent intensity reduction.

These results would appear to imply that a beam of discrete linearly polarized photons, unrelated in phase, properly aligned to a polarizer already provides the necessary means for assembling a useful generator of duality modulated radiation. However, the utility of a generator of duality modulated radiation resides in the generator's production of duality modulated radiation that can be subsequently restored to ordinary radiation in an application of the generator. In this regard, a linearly polarized beam of discrete photons, consisting of wave packets that have no relative phase relation to each other and no highly uniform wavelength, results in a duality modulated beam of those discrete photons that is highly inefficient in the transfer of energy quanta with a restoration beam. Moreover, these discrete photons do not satisfy the criteria set forth in the inventors' patents relating to suitable radiation for duality modulation and restoration, U.S. Pat. Nos. 6,028,686, 6,804,470, 7,262, 914, 8,081,383, and 8,670,181.

The practical utility of the present generator invention is realized through the novel insight of using a source that emits linearly polarized SLM radiation in place of linearly polarized discrete photons. SLM radiation beams consist of sequentially emitted coherence lengths each of which is comprised of large numbers of in-phase identical photons. These properties of SLM radiation are compactly summarized in René Dändliker, "The concept of modes in optics and photonics," In Sixth International Conference on Education and Training in Optics and Photonics, J. Javier Sánchez-Mondragón, Editor, SPIE Vol. 3831 (2000).

Linearly polarized coherence lengths of SLM radiation have functional analogies to the linearly polarized discrete photons, providing the advantages of efficient polarization-based duality modulation while avoiding the disadvantages of discrete photons with respect to equilibration restoration coupling. The functional analogies result in the irradiance, average wave intensity and occupation value for an ensemble of discrete linearly photons being applicable to an ensemble of sequentially emitted linearly polarized SLM coherence lengths.

The identical nature of constituent photons in SLM coherence lengths facilitates their efficient restoration in applications of the present invention. Suitable sources for the invention can be extended to those emitting MLM radiation when only enriched or modestly depleted radiation is required. The use of the coherent SLM and MLM radiations is consistent with the criteria set forth in the inventors' patents regarding suitable radiation for duality modulation and restoration, U.S. Pat. Nos. 6,028,686, 6,804,470, 7,262, 914, 8,081,383, and 8,670,181.

For convenience, SLM as well as MLM coherent radiations can be assigned arbitrary dimension-less values in much the same manner as those applied to discrete photons. Specifically, ordinary coherent radiation can be normalized to unit values of irradiance, $I=1$, and wave intensity, $W=1$.

Figure 1A:
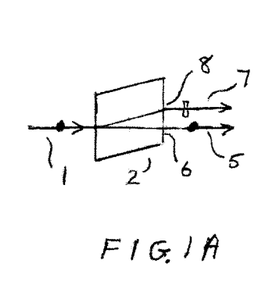
FIG. 1A is a top view of a two-channel birefringent polarizer component with a vertically v linearly polarized coherent source beam incident on an input of the polarizer. The polarizer's vertical V polarization axis is configured in alignment to the vertical v polarization axis of the incident source beam. The polarizer has a vertical V output and a horizontal H output associated, respectively, with the V and the H polarization axes of the polarizer. (From the perspective of this figure and those following, "vertical" represents a polarization axis, such as v or V, oriented perpendicular to the plane of the figure whereas "horizontal" represents a polarization axis oriented parallel to the plane of the figure.) A suitable polarizer for the invention may be of the transmissive type such as for both channels of the FIG. 1A birefringent polarizer. Alternatively, a suitable polarizer may be of the reflective type.
Figure 1B:
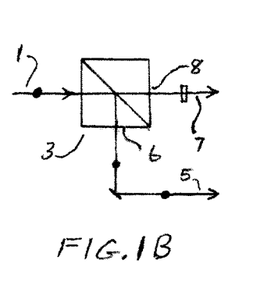
FIG. 1B is a top view depicting a similarly functioning configuration to that of FIG. 1A, utilizing instead a two-channel cube polarizing beam splitter (PBS) component, for which one channel V is reflective and the other H is transmissive. The diagonal line represents the optically active layer sandwiched between two transparent prisms that separates the polarization components of an incident beam. The polarizer's V polarization axis is configured in alignment to the v polarization of the source beam. The polarizer has a vertical V output from reflection, and a horizontal H output from transmission associated respectively with the V and the H polarization axes of the polarizer.

For further purposes here of convenience, the polarization axis of the linearly polarized SLM radiation emitted by the source is defined to be vertical v as indicated by a solid dot on the source input beam 1 to the two channel birefringent polarizer 2 in FIG. 1A and to the polarizing beam splitter cube 3 in FIG. 1B. This follows the common diagrammatic convention in the art of using a dot on a beam to indicate the vertical polarization of a beam relative to the image plane. The source beam 1 is input to a two-channel polarizer as in FIGS. 1A and 1B where for convenience the irradiance of beam 1 $I_i=1$ and the intensity $W_i=1$.

The polarizer in both figures has a polarization axis that is vertically oriented and an associated output 6 designated as the V output. The polarization axis v of the beam 1 and the V polarization axis of the polarizer are aligned.

A v polarized SLM beam 5 similar to 1 emerges from the V output 6 of the polarizer with an undiminished irradiance $I_v=1$ but with an average diminished intensity $W_v=0.89$. Consequently, the polarizer's V output 6 beam 5 has an average occupation value $$\Omega_v = I_v/W_v = 1/0.89 = 1.12$$

and the V output 6 beam 5 is enriched by an average of 12%.

The polarizer in both figures has its other polarization axis designated as H since it is horizontally oriented (lying in the plane of the figure). The associated output 8 is designated as the H output. The polarization axis v of the beam 1 and the H polarization axis of the polarizer are orthogonal.

From that H output 8 an SLM beam 7 emerges. That beam is a horizontal h linearly polarized beam with irradiance $I_h=0$ and with an average intensity $W_h=0.11$. Accordingly, the H output radiation beam 7 has an occupation value $$\Omega_h = I_h/W_h = 0/0.11 = 0$$

and the radiation beam is totally depleted.

In FIGS. 1A and 1B the horizontal h axial polarization of beam 7 is identified by a (non-solid) short line depicted transverse to the beam. This is consistent with the common diagrammatic convention in the art that a short line indicates a horizontal polarization of a beam relative to the image plane. An additional convention is introduced here in which the non-solid line further indicates a total absence of irradiance on the beam, which is the case for the horizontally polarized output beam 7 where $I_h=0$. This additional convention also applies to the use of a dot to indicate a vertical axial polarization. The use of a solid dot indicates the presence of irradiance as is the case for beams 1 and 5.

For ideal sources and polarizer components, $I_h$ does exactly equate to zero in configurations such as those in FIGS. 1A and 1B. However, for the variety of actual non-ideal sources and polarizer components known in the art, the resultant $I_h$ is small but does not exactly equal zero. Nevertheless, particular optimal non-ideal sources and polarizer components known in the art can reduce $I_h$ to such negligible levels that $I_h$ can be treated as zero for practical applications of the present invention and the associated radiation beam is regarded as "totally depleted".

Similarly, the idealization of lossless irradiance for a beam following an interaction with a polarizer is not exactly achieved in practice even if the polarization axes of the beam and polarizer are exactly aligned. For example if the vertically polarized beam 1 in FIGS. 1A and 1B is defined to have an irradiance I=1, the vertically polarized output beam 5 is also assigned unit irradiance, $I_v$=1. Nevertheless, for practical applications of the invention, optimal, near ideal sources and polarizer components known in the art can provide an insignificant loss of beam irradiance arising from an interaction with a polarizer.

Figure 1C:
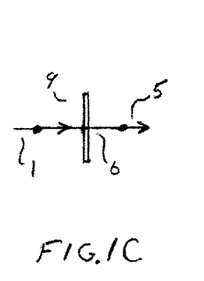
FIG. 1C depicts a top view of a one-channel plate polarizer component angularly oriented about the source beam propagation axis so that its single polarization axis is vertical V and in alignment with the vertical v linearly polarized source beam. The one-channel polarizer in this configuration has a single output that can be identified as a V output and is functionally equivalent to the FIGS. 1A and 1B configurations with their respective horizontal H outputs blocked.

When a one-channel polarizer is substituted for two-channel polarizer components such as those shown in FIGS. 1A and 1B, the results are the same for the corresponding, V or H, single available output. The one-channel polarizer 9 depicted in FIG. 1C is vertically polarized as indicated by its single output 6 which numerically identifies a V output. The vertical polarization of the polarizer 9 is additionally identified here by its output beam 5. The (solid) dot on output beam 5 signifies that the beam as well as the polarizer from which it emerges both have their polarization axes vertically oriented. The single emergent beam 5 is a v polarized SLM beam with I=1 and W=0.89 giving again $\Omega_v$=1.12 as in the V output beams 5 in FIGS. 1A and 1B. However, the single-channel polarizer shown in FIG. 1C has no H output and a W=0.11 is absorbed in the polarizer.

Figure 1D:
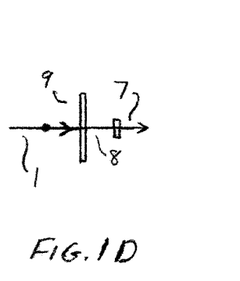
FIG. 1D depicts a top view of a one-channel plate polarizer component angularly set so that its single polarization axis is orthogonal to the v polarized source beam. The one-channel polarizer in this configuration has a single output that can be identified as an H output and is functionally equivalent to the FIGS. 1A and 1B configurations with their respective vertical V outputs blocked.

Conversely, the one-channel polarizer 9 depicted in FIG. 1D is oriented so that it is horizontally polarized as indicated numerically by its single output 8 as well as by the (non-solid) transverse line on the outgoing beam 7. As in the H outputs 8 in FIGS. 1A and 1B, the emergent beam 7 is an H polarized SLM beam with W=0.11 on average and $\Omega_h$=0 since $I_h$=0. Because there is no V output, I=1 and W=0.89 are absorbed in the polarizer 9.

It is of further relevance to the invention to examine angular alignment deviation of the source radiation polarization axis from the polarizer component's polarization axis. For this consideration, the outcome with a one-channel polarizer is examined but the results can be generalized to a two-channel polarizer.

As that deviation is increased by a progressive rotation of the source beam polarization axis relative to the polarizer's polarization axis, $\Omega$ decreases from the maximally achievable 1.12 to a minimum of 0 when the two axes are orthogonal. Accordingly, the duality modulation of radiation from the polarizer output is selectable over the entire range of maximal 12% enrichment to total 100% depletion by that relative rotation, equivalently expressed as a duality modulation range from +12% to -100%.

In the invention this selection is accomplished with "polarization rotation means" that might simply reside in the relative mechanical rotational alignment of the source and polarizer configuration or might instead consist of a physically separate, optical "polarization rotation component" interposed between the source component and the polarizer configuration.

When a two-channel polarizer is used for achieving a selectable range of duality modulations the two outputs of the polarizer provide mutually reversed duality ranges.

From these considerations of altering the beam's polarization axis relative to that of the polarizer, it is apparent that the initially considered alignments, e.g. those depicted in FIGS. 1A, 1B, 1C, and 1D, provide the maximally achievable enrichment and total depletion respectively from V 6 and the H 8 outputs of the polarizers in those figures. Most generally, output beams with these extremes of duality modulation for a source beam interacting with a single polarizer stage are provided when a source beam's polarization axis is aligned respectively with a polarization axis of the polarizer and orthogonally aligned to a polarization axis of the polarizer. These alignments are both specially identified as "axial alignment" in contradistinction to intermediate relative alignments that provide duality modulations intermediate to the extremes of 12% enrichment and 100% depletion, equivalent to respective duality modulations of +12% and -100%. In the context of a one-channel polarizer, axial alignment signifies that the polarization axis of the incident beam is either aligned with or is orthogonal to the polarization axis of the polarizer, which respectively provides an output beam that is maximally enriched or totally depleted. In the context of a two-channel polarizer, axial alignment signifies that the incident beam simultaneously satisfies both alignment conditions resulting in a maximally enriched output beam and a totally depleted output beam.

The above descriptions of the invention's functionality apply to the use of a source emitting coherent radiation of the SLM type. However, coherent sources are commonly of the multilongitudinal mode (MLM) type rather than the SLM type as a result of the former being technically easier to construct. This relative prevalence of MLM is particularly evident for lasers in the optical regime. The wavelengths of the respective multiple modes of a MLM source are nearly identical but are nevertheless distinct.

If an MLM source beam is linearly polarized, each of the constituent modes is identified as having that linear polarization. As with a linearly polarized SLM source, the linear polarization of an MLM source beam can be set to a particular orientation such as vertical v as indicated in FIGS. 1A, 1B and 1C. In this setting, a linearly polarized MLM source beam substantially provides functional equivalence to that of a linearly polarized SLM source beam 1 with respect to the V outputs 6, i.e. $I_v$=1 and $W_v$=0.89 for both beam types. Accordingly, the source beam 1, as in FIGS. 1A, 1B and 1C, can be SLM as well as MLM when only V outputs are utilized.

However, with respect to the H outputs, as in FIGS. 1A, 1B, and 1D, the vertically polarized MLM beam provides only a negligible $W_h \approx 0$ instead of the SLM $W_h$=0.11. This dichotomy arises because in axial alignment, where the polarization ensemble is aligned to the V axis of the polarizer, ensemble member orientations are statistically equally distributed at opposite (negative and positive) angles relative to V. Accordingly, there are equal distributions of oppositely signed projections onto the H axis which result in equal distributions of oppositely phased modes. Conversely, the projections along the V axis acquire no sign differential and the modes from the V output remain in-phase to the same degree as they were in the source beam.

Physically, these considerations are of no consequence when the source beam is SLM since only a single mode is present at any time. However, for an MLM source beam, the simultaneous presence of multiple, oppositely phased modes causes mutually destructive interference that substantially suppresses restoration of modes that had been projected onto the H axis whereas restoration is effective for modes that had been projected onto the V axis which are mutually in-phase.

Accordingly, with an MLM source beam in axial alignment, the utility of the invention in producing a totally depleted output beam with a consequential net wave intensity of modes is substantially suppressed for that special but important case of axial alignment.

For an SLM source beam, as the condition of axial alignment is incrementally altered by rotation of the source beam polarization axis relative to the V axis of a polarizer (at 0°), the H output depletion, which is 100% at 0°, is progressively reduced to 0% at a relative 45° rotation and finally to maximally achievable enrichment (12% for a single polarizer interaction) at a relative rotation of 90°. This same sequence would apply to an MLM source beam as well except that there is a simultaneous presence of oppositely phased modes in the H output beginning at 0° that remains substantial for small angle rotation, conditions that negate the ability to generate useful beams of high depletion. However, as the rotation angle is increased further, the axial projections yield an increasing preponderance of same-phase modes that results in modestly depleted H output radiation with useful levels of wave intensity comparable to what SLM would provide under similar conditions. Then as a practical matter, the utility of the invention using MLM source radiation extends from only modest depletion to maximally achievable enrichment.

Accordingly, the preferred embodiment of the invention uses a linearly polarized SLM radiation source which provides utility in the full range of duality modulation from total depletion to maximally achievable enrichment.

As a matter of common usage, the term "coherent radiation," without further specification, implies that the radiation may be either SLM or MLM. That usage is followed here.

FIGS. 1A, 1B, and 1C depict polarizer configurations of the invention that are comprised of a single polarizer "stage" in which beam 5 emerging from V output 6 of that single stage is enriched by a modest 12% where the incident beam 1 is ordinary.

That 12% enrichment arises because the ordinary incident beam 1 irradiance is entirely transferred to beam 5, i.e. $I_i=1=I_{v1}$ whereas the beam 1 intensity $W_i=1$ decreases to an average $W_{v1}=0.89$ on beam 5. Then $\Omega_{v1}=I_{v1}/W_{v1}=1.12$. A numerical subscript is added here and below to quantities such as $I_v$, $W_v$ and $\Omega_v$ in order to identify the stage from which they are output.

The beam enrichment of the present invention can be improved by providing a multiplicity of polarizer component stages in a sequential alignment configuration.

For polarizer configurations with a multiplicity of similar stages, the V output source beam of any component stage is directed to the successive component stage in an alignment matching that of the source beam's polarization axis relative to the first component. This relative alignment matching property at each successive stage constitutes the important defining criterion of a polarizer configuration of the invention.

The defining criterion of a polarizer configuration can be stated more generally in terms of axial alignment. If a source beam is in axial alignment with a polarization axis of a first stage polarizer, the corresponding output of that polarization axis provides a beam that is in the same axial alignment with the successive stage of a similar polarizer. This process is replicated for the beams from successive corresponding outputs. This replication for a polarizer configuration comprised of a plurality of one-channel polarizer stages results in a single maximally enriched output beam. Correspondingly, this replication for a polarizer configuration comprised of a plurality of two-channel polarizer stages results in a single maximally enriched output beam in addition to an equivalent plurality of totally depleted output beams.

Figure 2A:
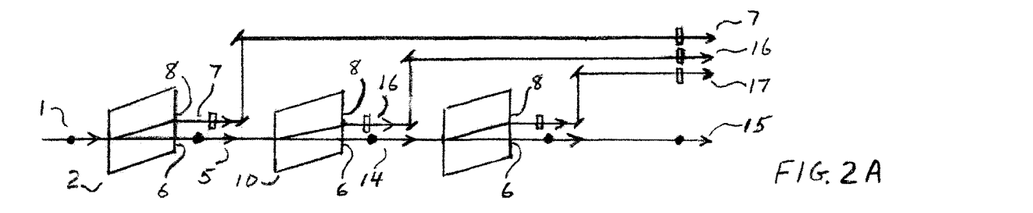
FIG. 2A is a top view of a polarizer configuration comprised of three sequential birefringent polarizer components where the v polarization axis of the source beam is respectively in alignment with the V axes of the polarizer components and orthogonally aligned to the H polarization axes of the polarizer components.
Figure 2B:
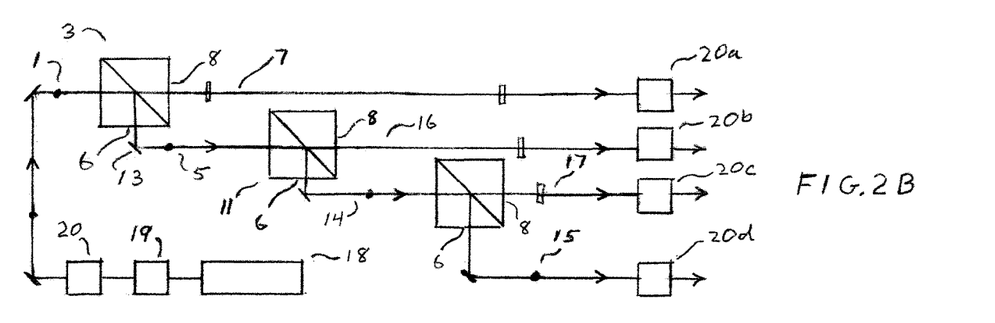
FIG. 2B is a top view of a sequential configuration of three PBS polarizer components functioning similarly to that of the FIG. 2A polarizer configuration. This figure also provides an overall view of the invention that includes the radiation source component, a polarization rotation component, and conventional modulation components, components that are omitted in the other figures, which depict only polarizer configuration variants of the invention.
Figure 2C:
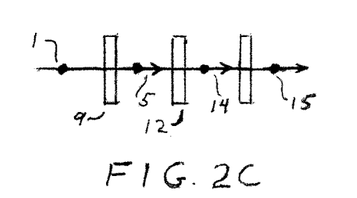
FIG. 2C shows a top view of a sequential configuration of three one-channel plate polarizer components with their respective vertical V oriented polarization axes in alignment with the v polarized source beam. The FIG. 2C polarizer configuration is functionally equivalent to the FIGS. 2A and 2B polarizer configurations with their respective H outputs blocked.

Accordingly, the V output beam 5 from the first stage polarizer component with $I_{v1}=1$ and $W_{v1}=0.89$ is directed at second stage polarizer components 10, 11, and 12 as shown respectively in FIGS. 2A, 2B, and 2C. These figures depict examples of improved beam enrichment using a multiplicity of three component stages.

Mirrors are utilized to redirect beam paths in order to provide some desired or convenient physical arrangement of polarizer components and output beams such as those depicted in FIGS. 2A and 2B while maintaining the functionality of the invention with respect to generating duality modulated radiation beams. For example, a typical mirror 13 in FIG. 2B redirects the V output beam 5 of first stage polarizer component 3 to the second stage polarizer component 11 in the same axial alignment as that for beam 1 on first stage polarizer component 3.

At the V output of the second stage polarizer component for FIGS. 2A, 2B, and 2C, the irradiance $I_{v2}=1$ and the irradiance is still unchanged on second stage V output beam 14 from the initial incident $I_i=1$. However, there is a wave intensity reduction from $W_i=1$ for beam 1 to $W_{v1}=0.89$ for beam 5. That reduction is compounded as beam 5 is incident on the second stage polarizer component. The V output beam 14 from that second stage polarizer component undergoes a 0.89 reduction in intensity relative to that of beam 5. Then the average wave intensity of beam 14 is $$W_{v2}=W_{v1}(0.89)=(0.89)^2=0.79,$$

resulting in an average occupation value $\Omega_{v2}=1/0.79=1.27$ for beam 14. Similarly, a third stage polarizer component results in $\Omega_{v3}=1/(0.89)^3=1.42$ giving a 42% enrichment on beam 15 emerging from the V output of that third stage polarizer component.

Additional polarizer component stages result in further increases in the final stage output enrichment. For example, for ideal polarizer components, a multiplicity of nine stages would provide an increase from $\Omega_i=1$ to $\Omega_{v9}=2.85$ giving a maximally achievable 185% enrichment. Practically achievable levels of enrichment are comparable to those of ideal polarizers since actual polarizers known in the art have efficiencies very closely approaching those of ideal polarizers.

Figure 2D:
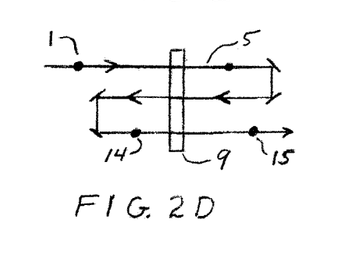
FIG. 2D depicts a functional equivalent to the FIG. 2C polarizer configuration achieving a sequential configuration by using a single polarizer component in combination with mirrors repeatedly redirecting output beams back to that component.

FIG. 2D shows an alternative embodiment of a three-stage polarizer configuration, functionally equivalent to that of FIG. 2C, achieved with only a single polarizer component 9 by using mirrors to repeatedly redirect the output beam to that polarizer component. This method is broadly applicable in replacement of other multi stage polarization configurations such as those depicted in FIGS. 2A and 2B when it is advantageous to reduce the number of polarizer components while retaining the duality modulation advantages of multi-stage configurations. The defining criterion of a polarizer configuration is maintained as the progressing beam is in axial alignment as it is repeatedly incident on a single polarizer component.

Most generally, the use of multi-stage polarizer configurations enhances the utility of the present generator invention in applications that require high levels of enrichment. For example, weak ordinary electromagnetic radiation signal beam with low irradiance and wave intensity W can effectively be amplified by equilibration with a highly enriched duality modulated radiation beam of a corresponding wavelength. In that equilibration process, the signal beam is itself enriched thereby improving the signal beam's detectability by energy-sensitive methods associated with common receivers.

The increased enrichment obtained when the polarizer configuration is comprised of multiple stages of polarizer components also relates to the range of duality modulation provided by the invention when polarization rotation means is used. For example, FIG. 2B depicts a three stage polarizer configuration for which the maximally achievable enrichment is 42%. Accordingly, the full range of duality modulation for that polarizer configuration extends from +42% to −100%.

The invention implicitly includes polarization rotation means that facilitates generating output beams of any selected duality modulation within that full range by a selected rotational alignment of the source component 18 and the polarizer configuration. FIG. 2B depicts a polarization rotation component 19 that constitutes a physically separate embodiment of the of the polarization rotation means that is interposed between the source component 18 and the polarizer configuration. Component 19 may be of a type that achieves this selective beam rotation by mechanical rotation of the component itself. In the optical regime, a component known as a half-wave-plate has this property. Alternatively, component 19 may be of a type that achieves this selective beam rotation by an electrical signal. In the optical regime, this capability is provided by an electro-optical component such as a Pockels cell well known in the art, e.g. Eugene Hecht and Alfred Zajac (1974). *Optics*. Addison-Wesley Publishing Company, Inc. pp 263-266.

With regard to most efficiently generating depleted beams with the present invention, the H output beam from a single polarizer stage is already totally depleted with $\Omega_{h1}=0$ for ideally performing components in configurations shown in FIGS. 1A, 1B and 1D. Nevertheless, for many applied uses of the invention it is advantageous to maximize the flux of totally depleted radiation.

It may be appreciated that even though a totally depleted beam has I=0, the utility of that beam is diminished if the accompanying wave intensity W is too low. Random natural attenuation processes occurring during a beam's transit in an applied use may further reduce W to such an extreme that no statistically significant irradiance can be restored on the remaining W. Accordingly, with respect to totally depleted beams, the utility of the present generator is enhanced by maximizing the flux of those totally depleted beams.

The single totally depleted H output beam 7 in FIGS. 1A and 1B has an intensity $W_{h1}=0.11$ which constitutes a significant but still modest 11% extraction of the initial source beam 1 intensity $W_i=1$ while the enriched V output beam 5, with an intensity $W_{v1}=0.89$, exits with fully 89% of that initial source beam intensity.

Most generally, improved flux of totally depleted beams is achieved by using a sequential set of two-channel polarizer component stages where axial alignment is maintained as the progressively enriched beam is incident on each successive stage. Axial alignment then provides for a totally depleted radiation beam at the H output of each successive polarizer component. For example, FIGS. 2A and 2B show the three totally depleted beams emergent respectively from the three H outputs of the polarizer components. As shown in these figures, mirrors may be used to facilitate redirection of the totally depleted radiation beams 7, 16, and 17 into an array of beams having juxtaposed parallel trajectories.

The total flux advantage of this method is readily calculated. Totally depleted beam 7 is already known to have an intensity $W_{h1}=0.11$. Totally depleted beam 16 is generated from enriched beam 5, with an intensity $W_{v1}=0.89$, incident on the second stage polarizer component. The intensity of that totally depleted beam 16 is a 0.11 fraction of the beam 5 incident intensity. Consequently, the beam 16 intensity is $W_{h2}=(0.11)W_{v1}=0.11(0.89)=0.0979$. Similarly, the intensity of the totally depleted beam 17 is a 0.11 fraction of the beam 14 intensity $W_{v2}=(0.89)^2$ incident on the third stage polarizer component. The beam 17 intensity is then $W_{h3}=0.11(0.89)^2=0.087$.

The sum of the intensities for beams 7, 16, and 17 is 0.295, representing a 29.5% extraction of intensity from the source beam 1 for the three-stage configurations depicted in FIGS. 2A and 2B. That extraction value is further improved by increasing the multiplicity of stages. For a nine-stage configuration the resultant extraction value is 65% of the source beam intensity.

This capability of multi-stage configurations, such as those depicted in FIGS. 2A and 2B, provides utility for the present invention in applications that require a large flux of totally depleted beams. Totally depleted beams used for stealthy radar and lidar are examples of applications that particularly benefit from a large intensity flux.

Figure 3:
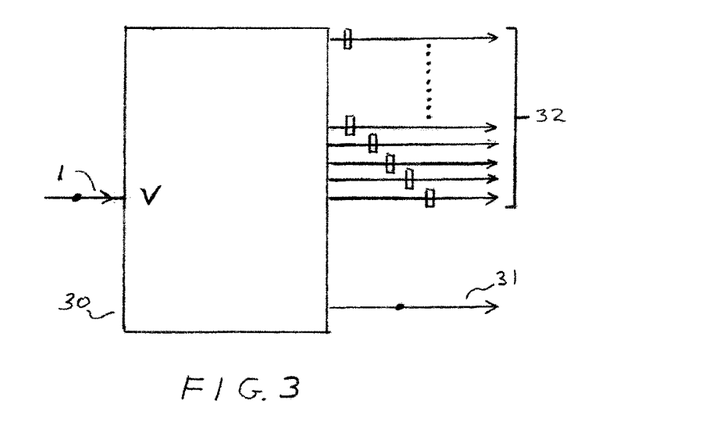
FIG. 3 is a block diagram representation of a generalized polarizer configuration with a source beam polarization axis alignment relative to the polarizer configuration in common with that alignment for all of the preceding figures. The resultant output is at least one of the beams from the depicted multiplicity of totally depleted beams and the single maximally enriched beam.

FIG. 3 depicts a block diagram representation of a generalized polarizer configuration. As with the source beam 1 in FIGS. 1 and 2, source beam 1 in FIG. 3 is also identified as vertically polarized by the dot on the beam. The rectangular block 30 representing a generalized polarizer configuration includes "V" at its input to suggest that, as depicted, source beam 1 and the generalized polarizer configuration 30 are effectively in condition of axial alignment with each other which may result in a maximally enriched output beam 31, one or more totally depleted output beams 32, or both.

It may be appreciated that consistent imposition of axial alignment at each stage provides for maximally achievable beam enrichment and maximally achievable flux of totally depleted beams in the transition from single stage polarizer configurations to multiple stage polarizer configurations.

All of the various polarizer configurations in the figures are deliberately arranged as two-dimensional, i.e. coplanar, for purposes of clearly depicting the interrelationships of the beam and the polarizer components. Although such coplanar polarizer configurations might in fact provide particular utility, a functional polarizer configuration is not inherently restricted to being coplanar. For example, a three-dimensional assemblage of multiple polarizer components can readily be formed by the use of mirrors directing a beam successively to those components. That assemblage is consistent with a polarizer configuration of the invention if the relevant defining criterion is satisfied, i.e. the relative alignment of the beam and a polarizer component is maintained as the beam progresses through the succession of components.

The principal function of the invention is generating, from an ordinary source beam, a duality modulated output beam. For various applications of the invention, that output beam may be either enriched or depleted, signifying that the $\Omega$ ratio of irradiance to wave intensity is modulated to some higher or a lower value, respectively.

The utility of the invention is greatly increased by including the capability to additionally conventionally modulate the duality modulated beam while maintaining the selected $\Omega$. Minimally, this conventional modulation may simply comprise a steady-state proportionate alteration of the I and W flux densities. This alteration is most trivially accomplished by setting the source's beam output power to a different value, a capability common to the radiation sources that are suitable for the invention. This capability is readily available with a variable power klystron tube operating in the radio or microwave regime and with a laser diode in the optical regime by modulating the diode driving current.

In an example of the effect of power modulation, an ordinary radiation beam from a source with I=1 and W=1 is used to generate a 12% enriched beam ($\Omega$=I/W=1.12) with I=1 and W=0.89 following transmission through a properly oriented polarizer component. If the source beam is then conventionally modulated by setting a power reduction of 0.5, the output beam transmitted through the polarizer component is reduced to I=0.5 and W=0.445 but the duality modulation of the beam is unchanged at a 12% enrichment with $\Omega$=0.5/0.445=1.12.

More generally, however, the greatest utility of conventional modulation means with respect to the invention resides in applying that means to temporally rapidly encode duality modulated beams by any of several distinguishable parameters.

Power modulation is one such parameter suitable for temporal modulation encoding. (Modulating the power parameter is basically comparable to conventional "amplitude modulation".)

Temporal modulation of power may be achieved using a source that has a selectable beam power with the additional requirement that the power is temporally controllable, most typically by an encoded electrical signal to the source. Temporally controllable beam power is similarly common to sources such as those suitable for the invention. Such sources intrinsically include the capability to temporally encode their output beam by rapid modulation of the beam's power in response to an encoded electrical signal input to the source. The invention, using a source with this intrinsic temporal power modulation capability, would provide duality modulated beams on which the proportionate flux density magnitudes I and W are temporally encoded by the same modulation.

Alternatively, the invention may include physically separate "conventional modulation components" 20, 20a, 20b, 20c, and 20d as depicted for example in FIG. 2B. Any or all of these components may be of the type that temporally modulates the parameter of beam power. In the context of the present invention which generates duality modulated beams of radiation, the temporal modulation is more clearly expressed in terms of the proportionate flux densities I and W. This alternative expression is more appropriate because the term "power" properly implies an energy flux. If a totally depleted output beam is generated, the power of the output beam is zero and power modulation would appear to be irrelevant. However, power modulation equivalently applies to both I and W flux densities. Consequently, even if the irradiance I is completely extracted from a beam by duality modulation, the temporal modulation of "power" by conventional means situated before or after the polarizer configuration results in the temporal modulation of the wave intensity W.

Conventional modulation means such as 20, 20a, 20b, 20c, and 20d as depicted for example in FIG. 2B are extrinsic to the source component 18. These components can provide temporal conventional modulation means for any of a variety of different beam parameters that are not commonly modulated by a radiation source 18. These components can also be of a type that provides temporal modulation of the beam's proportionate flux densities by beam power modulation using source 18.

For example, temporal modulation of these flux densities can be achieved by an electro-absorptive modulator where an electrical encoding signal alters the absorption coefficient of a material by using the Franz-Keldysh effect, the quantum-confined Stark effect, the variation of free carrier density, Fermi level changes or other absorptive-responsive phenomena. This class of electro-optic modulators is discussed in Robert G. Hunsperger (sixth ed.) (2009) *Integrated Optics*. New York: Springer Sciences and Business Media. ISBN 978-0-387-89774-5. pp. 178-181.

Refraction-based modulators can also provide extrinsic temporal conventional modulation means. These modulators may utilize magneto-optic effects, acousto-optic effects, or electro-optic effects, e.g. on lithium niobate, to alter the phase of transmitted radiation in response to an electrical signal. That phase alteration, effectively constituting a phase encoding, can alternatively be utilized to temporally modulate the beam's proportionate flux densities when used in conjunction with a Mach-Zehnder interferometer or a directional coupler. These modulators are treated in the comprehensive work of Bahaa E. A. Saleh and Malvin Carl Teich (first ed.) (1991) *Fundamentals of Photonics*. New York: Wiley-Interscience Publications. ISBN 0-471-83965-5. pp. 700-709, 719-720, and 815-817.

External conventional modulation means for providing polarization encoding of radiation can be provided by means such as Pockels cells. A phase shift is generated on linearly polarized beams which can impose elliptical polarization encoding on those beams. Pockels cells are discussed in Eugene Hecht and Alfred Zajac (1974). *Optics*. Addison-Wesley Publishing Company, Inc. pp 263-266.

Additionally, the electro-active polarization rotation component 19, which can be used to provide a selected steady-state value of duality modulation, can also be used to temporally modulate duality modulation. This capability can be used in combination with temporal modulation of the beam's flux densities to generate useful encoding variants such as a beam having a constant irradiance but with a temporal modulation of its wave intensity.

The positioning of conventional modulation means either before or after the polarizer configuration is relevant to various encoding objectives. For example, in FIG. 2B source 18 which may intrinsically provide conventional modulation as well as conventional modulation component 20 are both positioned before the polarizer configuration. As a result, conventional modulation produced by source component 18 or component 20 identically encodes all polarizer configuration output beams 7, 16, 17, and 15. Alternatively, individual polarizer configuration output beams such as 7, 16, 17, and 15 can be individually encoded by including conventional modulation components such as, respectively, 20a, 20b, 20c, and 20d positioned after the polarizer configuration.

These considerations regarding conventional modulation means apply broadly to the various polarizer configurations disclosed here and are not restricted to the particular polarizer configuration depicted in FIG. 2B.

In applications of duality modulated radiation disclosed by the inventors in their U.S. Pat. Nos. 6,028,686, 6,804,470, 7,262,914, 8,081,383, and 8,670,181 the capability to conventionally modulate duality modulated is highly advantageous.

For example, in scanning energy-sensitive biological specimens with totally depleted radiation it is essential that the radiation be modulated to some constant level appropriate to the size and the material wave attenuation characteristics of the specimen.

In communications applications using a totally depleted radiation beam, a rapid temporal conventional modulation is needed to encode information onto the beam.

For the purposes of familiarity, many of the examples of the invention have been presented here in the context of the optical regime of the electromagnetic spectrum. However, the scope of the invention and its claims are not restricted to that regime and extend broadly over the electromagnetic spectrum.

Significantly, there are suitable alternatives in non-optical regimes for the critical invention components of a coherent source and polarizer. For example, a free electron laser provides a satisfactory coherent source in the x-ray regime, e.g. see C. Pellegrini, "The history of X-ray free electron lasers," The European Physical Journal H, October 2012, Volume 37, Issue 5, pp 659-708. An atomic lattice provides a suitable polarizer in the x-ray regime. Emilio Segre (1965). *Nuclei and Particles*. New York: W. A. Benjamin, Inc. p 73 examines the Klein-Nishina formula with respect to plane polarized x-ray scattering as a function of the radiation's polarization axis relative to a lattice target. In the microwave regime, a klystron tube provides a requisite coherent source. U.S. Pat. No. 4,730,170, Mar. 8, 1988, by Thomas J. T. Kwan and Charles M. Snell, "Virtual cathode microwave generator having annular anode slit" provides a particular example of a microwave generator that produces SLM microwave radiation. Polarizers suitable for the microwave regime include simple parallel wire arrays as well as more sophisticated devices such as that disclosed in U.S. Pat. No. 3,023,379, Feb. 27, 1962, by E. H. Turner, "Transversely magnetized non-reciprocal microwave device" which functions as a microwave analog of birefringent optical polarizers.

In very general terms, the invention pertains to a generator of duality modulated electromagnetic radiation using novel polarization methods and means. In applications of duality modulation generators disclosed by the inventors in their U.S. Pat. Nos. 6,028,686, 6,804,470, 7,262,914, 8,081,383, and 8,670,181 the duality modulated radiation beam may be transmitted through free space, atmosphere or vacuum, or through waveguides or optical fiber. Moreover, in these applications the duality modulated beam is typically restored to an ordinary radiation beam for measurement purposes by means of a transient equilibration coupling with an ordinary coherent "restoration beam" of substantially the same wavelength as described in the inventors' patents. In some of the applications, such as biological specimen scanning, lidar, and radar, the requisite restoration beam can be split off from the generator's source beam before it is duality modulated. In other applied uses such as long-range communication with a totally depleted and temporally-modulated radiation beam, a separate source of radiation, essentially identical to the source radiation of the duality modulation generator, is necessarily situated at the remote receiver to restore the received totally depleted radiation to ordinary temporally-modulated radiation suitable for conventional detection.

It will be appreciated from the foregoing detailed description that the present invention may take any of a number of different forms and embodiments, as disclosed herein and in the accompanying drawings. It will also be appreciated that the invention is not necessarily limited to those disclosed embodiments, which are described herein only by way of illustration. Accordingly, the invention should be limited, if at all, only by the appended claims.

The invention claimed is:

1. The generator of conventionally modulated totally depleted duality modulated electromagnetic radiation, comprising:
   a source providing a single longitudinal mode (SLM) linearly polarized electromagnetic radiation source beam;
   conventional modulating means; and
   a polarizer having a particular polarization axis at an input for receiving the source beam and an output associated with that input from which electromagnetic radiation beam is emitted;
   wherein the polarization axis of the source beam and the polarization axis of the polarizer at the input for receiving the source beam are mutually orthogonal;
   wherein the output of the polarizer emits a conventionally modulated totally depleted duality modulated electromagnetic radiation beam; and
   wherein the conventional modulating means is provided intrinsically to the source by an encoded electrical signal input to the source, whereby the output of the polarizer emits a conventionally modulated totally depleted duality modulated electromagnetic radiation beam.

2. The generator of conventionally modulated totally depleted duality modulated electromagnetic radiation, comprising:
   a source providing a single longitudinal mode (SLM) linearly polarized electromagnetic radiation source beam;
   conventional modulating means; and
   a polarizer having a particular polarization axis at an input for receiving the source beam and an output associated with that input from which electromagnetic radiation beam is emitted;
   wherein the polarization axis of the source beam and the polarization axis of the polarizer at the input for receiving the source beam are mutually orthogonal;
   wherein the output of the polarizer emits a conventionally modulated totally depleted duality modulated electromagnetic radiation beam; and
   wherein the positioning of conventional modulating means, physically separate from the source, is extrinsic to the source, whereby the generator emits a conventionally modulated totally depleted duality modulated electromagnetic radiation beam.

\* \* \* \* \*